Jan. 6, 1970                K. T. BARKEY                3,488,382
ESTER EXCHANGE PROCESSES
Filed April 10, 1967                                          2 Sheets-Sheet 1

KENNETH T. BARKEY
INVENTOR

BY

ATTORNEYS

Jan. 6, 1970 K. T. BARKEY 3,488,382

ESTER EXCHANGE PROCESSES

Filed April 10, 1967 2 Sheets-Sheet 2

KENNETH T. BARKEY
INVENTOR

BY

ATTORNEYS

United States Patent Office 3,488,382
Patented Jan. 6, 1970

1

3,488,382
ESTER EXCHANGE PROCESSES
Kenneth T. Barkey, Rochester, N.Y., assignor to Eastman Kodak Company, Rochester, N.Y., a corporation of New Jersey
Filed Apr. 10, 1967, Ser. No. 629,740
Int. Cl. C08g 17/08; C07c 69/82
U.S. Cl. 260—475        4 Claims

ABSTRACT OF THE DISCLOSURE

It has been discovered that the ester exchange reaction of ethylene glycol or propylene glycol with dimethyl terephthlate (DMT) can be accomplished with greater speed and efficiency, provided that certain critical process elements are observed. These process elements include:
(a) using a minimum pressure drop across the vapor phase equipment (used to separate methanol from glycol and DMT);
(b) removing superheat from the vapors by external heat exchangers; and
(c) carefully controlling the relative temperatures of the heating means, the refluxed glycol, and the vapors.

Figure 1:
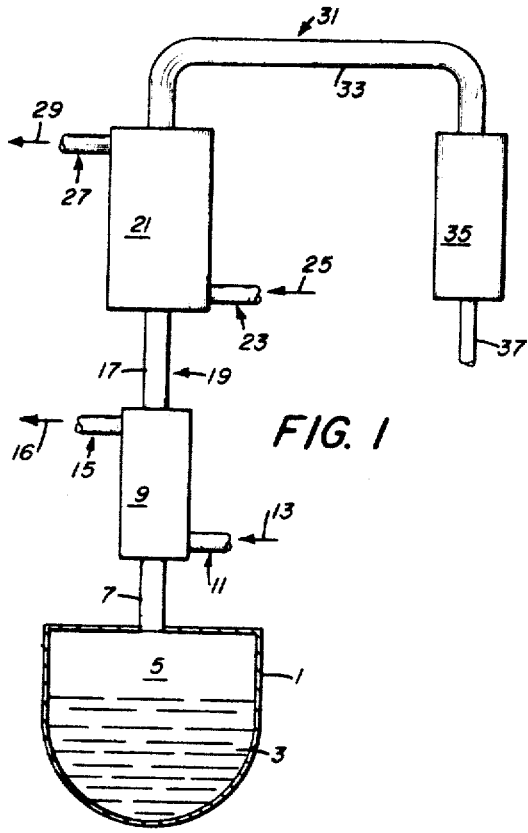

This invention relates to the preparation of linear polyester of glycols and terephthalic acid. More particularly, this invention relates to an improved ester interchange process in which glycol is exchanged with the methyl moiety in dimethyl terephthalate.

The preparation of polyesters such as poly(ethylene terephthalate) and poly(propyleneterephthalate) by ester exchange and condensation is well known. U.S. Patents 2,465,319 and 2,727,881 and many others describe such processes in great detail. A common feature of a large number of these processes is that they begin with a lower dialkyl ester of a bifunctional dicarboxylic acid which is condensed with a bifunctional glycol, the glycol usually being used as such although it can be used in the form of lower alkanoic acid ester thereof, such esters being equivalents of the glycol. These processes involve the initial preparation, in the presence of a catalyst, of a substantially monomeric protopolymer under conditions facilitating removal of the lower alkanol formed from the lower dialkyl ester by ester interchange with the glycol. This is sometimes referred to as the "first stage" or the "ester exchange" step of the polyester preparation and can be conducted under a variety of conditions using many different types of apparatus. For example, the lower dialkyl ester and the glycol in a mole ratio beginning at about 1 to 1.5 up to about 1 to 10 are placed in a reaction vessel equipped with a packed column with the vessel being heated at a temperature which permits the lower alkanol to pass through the column, with the glycol being retained by the column and returned to the reaction vessel by refluxing, whereby the lower alkanol is theoretically removed during this first stage of the polyester preparation which results in the formation of a monomeric protopolymer.

The catalysts which may be used in the preparation of polyesters include organic and inorganic compounds of metals such as titanium, manganese, antimony, zinc, tin, lead, calcium, cobalt, lithium, combinations thereof, etc., have heretofore been utilized by those skilled in the art. The prior art, for example, discloses a great number of such catalysts, some of which are described in patents such as U.S. 2,465,319, U.S. 2,720,502, U.S. 2,727,881 and others. Specific catalysts heretofore known and which may be utilized include tetraisopropyl titanate, titanium dioxide, zinc acetate, zinc acetyl acetonate, lead oxide, calcium oxide, lithium ethoxide, antimony trioxide, manganese

2 oxides and the like. Generally, the acetates, chlorides, nitrates, sulfates, oxides and alkoxides of one or more of the metals zinc, manganese, tin, lead, titanium, antimony, cobalt and lithium are preferred. For example, the catalyst system of zinc acetate and tetraisopropyl titanate is well suited to attain the desired reaction activity. The catalyst (or catalyst mixture) is generally utilized in a concentration of from about 0.002 percent to about 0.2 percent by weight of the reactants being condensed. Higher or lower percentages can also be employed. Generally from about 0.001 percent to about 0.05 percent catalyst can be advantageously employed. Preferred ester exchange catalysts include, for example, zinc acetate, manganous acetate, cobaltous acetate, lithium acetate and tetraisopropyl titanate. However, many others are known.

As stated above, it is known that the preparation of polyesters from a glycol and a dibasic acid or acid ester is facilitated by the use of catalysts and that polyesterification is a reversible, equilibrium reaction which may be exemplified as follows:

$$RCOOR' + R''OH \rightleftharpoons RCOOR'' + R'OH \qquad (1)$$

wherein, for poly(ethylene terephthalate), R represents $CH_3OOC$-phenyl, $HOCH_2CH_2OOC$-phenyl or

R' represents —$CH_3$ or —$CH_2CH_2OH$ and R" represents $HOCH_2CH_2$— or

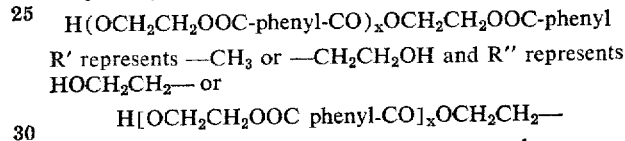

The reaction usually takes many hours to complete.

Polyesterification are reversible, equilibrium reactions. Throughout the entire reaction (i.e. from ester exchange to end product), the system is trying to approach a defined equilibrium. The reaction goes to the right or toward completion only when the products of the reaction are removed. There are a number of equilibria in the ester exchange reactor; for example, the vapor above the reaction tends to equilibrate with the reaction mixture and also with the refluxing liquids returning to the reaction. Also, the refluxing liquids tend to equilibrate with the vapors above it. These together control the degree that the forward reaction rate is suppressed by the backward reaction as an equilibrium is approached.

In the ester exchange reaction to form poly(ethylene terephthalate), for example, dimethyl terephthalate and ethylene glycol are reacted. Methanol is evolved only after it has been formed as a result of the ester exchange reaction. Toward the end of the ester exchange reaction, the starting materials have been transformed into a melt. The composition of the vapor above the ester exchange reaction mixture is dependent on such variables as the extent of the reaction, the mole ratio of ethylene glycol to dimethyl terephthalate, the temperatures of the reaction system and the choice of catalysts and their concentrations. The evolved vapors are invariably superheated to some extent as a result of the reaction and reactor temperatures.

Ethylene glycol-methanol liquid mixtures at atmospheric pressures and below 197° C. (387° F.) have defined boiling points and vapor compositions. Vapors evolved from the reaction may be at higher temperatures than the temperatures corresponding to the theoretical equilibrium relationship.

Accordingly, during the ester exchange reaction superheated alcohol (e.g. methanol), glycol (e.g. ethylene glycol) which also is superheated during the latter stages of the reaction, sublimed diester (e.g. dimethyl terephthalate), water, etc. are evolved. It is presently customary to separate the glycol and alcohol by fractional distillation, the alcohol being isolated in a relatively pure liquid form and ultimately being removed from the process. Since sublimate from the reaction must be prevented from distilling with the methanol and thereby being removed from the process, it is customary to at least partially condense the glycol vapors so that the returning "reflux" of liquid glycol washes down the sublimates. Thus, the condensed ethylene glycol dissolves and washes the sublimed dimethyl terephthalate (hereinafter called DMT), back into the reactor. Such operation is required for a commercially practical ester exchange reaction.

In addition, since the vapors evolved from the ester exchange reactor are substantially superheated, it is conventional practice to recycle part of the alcohol back into the distillation column (in which the mixture of glycol and methanol vapors is fractionally separated) for the specific purpose of removing such superheat, with the objective of recycling just enough alcohol to absorb (by evaporation) the superheat. Actually, because of the ever changing nature of the gas stream, and because of the complicated interplay of time, temperature, rate of heating, condenser cooling control variables along the column, and the like, removal of just the right amount of heat in this manner is a very difficult thing to do.

Figure 2:
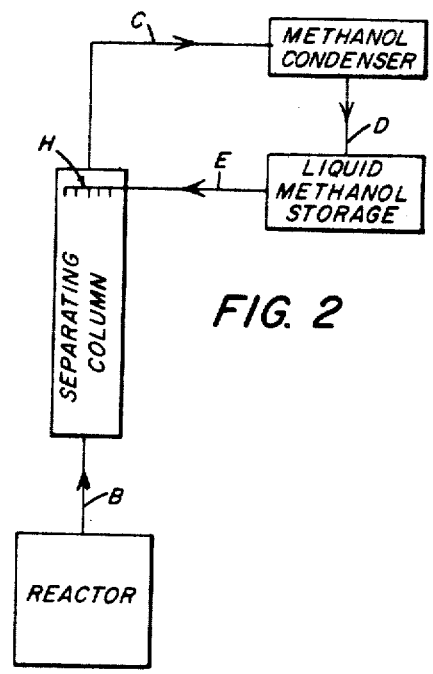

FIGURE 2 illustrates in graphic form such a conventional ester exchange process. The mixture of gasses containing superheat is conducted from the hot reactor through conduit B into the "separating column." The separating column, typically, is a packed or baffled column or a "bubble cap" or similar column containing at least about 10 theoretical plates. In any event, the gas stream in such a conventional ester exchange process is interrupted by the "baffles, packing, bubble caps, and the like in this column (following good theoretical "distillation" principles) in order to achieve simultaneous (a) separation of glycol and methanol and (b) removal of superheat, as described above. Recycled (liquid) methanol is distributed into the separating column through one or more nozzles H. Liquid glycol (containing dissolved DMT that had sublimed from the reactor in the hot gas stream) is returned to the reactor through conduit B. Methanol vapors (sometimes containing a small amount of water) are passed through conduit C from the separating column to a "methanol condenser" where the methanol is condensed and from which liquid methanol is removed through conduit D to storage. The amount of liquid methanol distributed to the nozzles H is regulated by controlling its flow rate through conduit E by any suitable means.

In commercial practice, such a conventional process generally requires several hours for the desired ester exchange reaction to reach 98 percent of completion. It can readily be appreciated that a significant reduction in the amount of time required to achieve a practically complete reaction is the desire of practically everyone involved in the manufacture of poly(ethylene terephthalate) or poly(propylene terephthalate) via the "ester exchange" approach. However, while this has been a definite goal in this field for many years, efforts to achieve this desired result have not heretofore been very successful. Thus, attempts have been made to conduct the exchange reaction under greatly reduced pressures, under increased pressures, with increased or decreased catalyst concentrations and by utilizing very high reaction temperatures, as well as several combinations of these approaches, apparently without a significant degree of success.

Accordingly, it is an object of the invention to provide, in a polyesterification process, an accelerated and more complete ester exchange reaction.

Another object of the invention is to provide apparatus and procedures which allow the ester exchange reaction to proceed at its optimum, maximum rate.

These objects, as well as others which will become apparent from the following discussion, can be achieved surprisingly, by conducting the ester interchange process in a manner that appears to be contrary to what is ordinarily recommended as a result of theoretical considerations of the process. Thus, it has been discovered that, by (a) increasing the efficiency of the means whereby superheat is removed from the gas stream, (b) decreasing the amount of reflux and contact time of vapor and reflux, and (c) by simultaneously observing certain critical processing elements, the desired reaction can be practically completed in a fraction of the time required by conventional procedures. For example, by following the process of the present invention, the time required to achieve substantial completion of the ester exchange in a typical commercial poly(ethylene terephthalate) operation (i.e. 99% or more) can be reduced from more than 4 hours to less than 40 minutes.

Thus, it has been discovered that the ester interchange step described above can be surprisingly accelerated, and also result in a more complete reaction than was heretofore believed possible, provided that a combination of carefully controlled process elements are utilized. The process elements that are critical insofar as the successful practice of this invention is concerned are:

(1) Practically all of the superheat must be removed from the vapors evolved during the reaction via "external" heat exchange (i.e., without any recycled methanol).

(2) The alcohol content of the liquids that are refluxed (i.e., returned to the reaction mixture after it is condensed) must be kept at a minimum (preferably as close to zero as possible, but in any event at most about 1 weight percent).

(3) The temperature of the (refluxing) liquid stream that is returned to the reaction mixture must be maintained as close to the boiling point of the glycol as possible, but within about 5° C. thereof if full advantage of this invention is to be gained.

(4) The flow of the vapor stream must be essentially uninterrupted during the removal of the superheat and the condensation of the glycol and sublimates.

(5) The temperature of the heating means in the reaction (for example, the walls of the reaction) must be maintained within the range of from about 25° C. to about 40° C. higher than the temperature of the reaction mixture in the reactor during at least 90% of the period of time alcohol is being formed in the reactor, if significantly improved reaction rates and full advantage of this invention are to be gained.

(6) The temperature of the heat exchange means of (1), above, must be controlled so that substantially no methanol is condensed thereby, and so that the temperature of the gas stream exiting from the heat exchange means is between about 65° C. and about 80° C.

(7) The pressure drop across the equipment utilized to remove the superheat must be maintained at a minimum (i.e., below about 10 inches of water, and preferably below about 6 inches of water).

This invention is particularly surprising since the dramatic benefits that can be obtained by practicing it are made possible by taking a seemingly less desirable (as compared with the present commercial operations described above) approach of (a) removing superheat of the vapors by "external heat exchange" means; (b) minimizing equilibrium between evolved vapors and returning reflux; and (c) returning the reflux to the reaction mass at a temperature as near to the boiling point of the glycol as possible.

The term "external heat exchange" is used herein to distinguish this particular aspect of the present invention from the conventional method (described above, of removing superheat by evaporating recycled methanol inside a distillation column). Thus, in the present processes, such recycling of liquid alcohol is not only undesirable, but is actually detrimental, because in order to efficiently evaporate liquid alcohol in the column a relatively large amount of surface (in the column) must be provided, and such a provision would inherently detract from points (1), (2), (4) and (7) above.

The implementation of (1), (4) and (7) above, fortunately, can be attained simultaneously by utilizing, for example, a simple shell and tube type heat exchanger with a minimum pressure drop across it. The temperature of the walls of the heat exchanger can readily be controlled and varied along the length of the exchanger so that the necessary fairly precise control of most of the other essential processing elements is possible.

One of the preferred ways of carrying out the processes of the present invention is by utilizing an external heat exchanger to thereby make it possible to follow all of the critical process elements described above under optimum conditions. This preferred process is illustrated by FIGURE 1. In the reaction of ethylene glycol and DMT, for example, the temperature of the walls of the reactor 1 in contact with the reaction mixture 3 is maintained at least about 10° higher, preferably 20 to 40° C. but not excessively higher, than the temperature of the reaction mixture 3 during the entire course of the reaction. [Actually, for optimum results, the temperature of the walls of the reactor is maintained within about 1° C. of the curve AB in FIGURE 3 at all times; the particular point along curve AB being determined by extent of the reaction (the amount of methanol collected from condenser 35 in FIGURES 1).] During the reaction, superheated vapors 5 of ethylene glycol and methanol (along with some DMT and possibly some water) are conducted through conduit 7 to a first condenser 9, the temperature of which is maintained so that the exiting vapor 17 has a temperature within the range of from about 90° C. to about 160° C.

A preferred temperature of exiting vapor 17 is about 140° C., which is just above the melting point of DMT. Thus, a value of 140° C. ensures that excessive solids (DMT) will melt, and can be returned to the reactor, regardless of which catalysts and other conditions are present in the reactor. The use of temperatures lower than 140° C. simply makes it necessary to exercise care that any sublimed DMT is dissolved in the glycol reflux before it builds up excessively on the heat exchanger walls. The temperature of the heat exchanger 21 is also controlled at a point sufficiently high to prevent methanol from condensing, but definitely below the boiling point of the glycol (to assure practically complete condensation of the glycol remaining in the vapor stream at this point). A significant amount of DMT can be dissolved in glycol at these temperatures. For example, at 90 C., up to 14 weight percent of DMT can be dissolved successfully in liquid ethylene glycol. Low pressure, steam, air, water and the like can be used successfully to control the temperature of the heat exchanger to achieve these necessary controls. Such control is well within the ability of the ordinarily skilled artisan without a more extensive discussion here.

In this way, most of the glycol and some of the DMT are condensed in the first heat exchanger 9 and are returned to the reactor through conduit 7. The partially purified gas stream is then conducted into a second shell and tube heat exchanger 21, the temperature of which is maintained with cool (optimally about 65° C.) water to thereby cool the gas stream, so that the temperature of the gas stream 33 exiting from said second heat exchanger 21 is within the range of from about 65° C. to about 85° C., preferably at 70–75° C. This exiting gas stream 33 consists almost entirely of methanol, and preferably contains at most about 0.5 mole percent of ethylene glycol; practically all of the remainder of the ethylene glycol in the gas stream being condensed in the second heat exchanger. The DMT dissolves in the glycol at the temperatures prescribed for this operation. Thus, the equipment in the practice of this invention can readily be maintained free of plugging by sublimed DMT. (Plugging is a significant problem in conventional practice.) After leaving the second heat exchanger 21, the methanol vapors are conducted through conduit 31 to condenser 35 in which the methanol is condensed, and subsequently removed from the process via line 37. As it was indicated before, in the processes of this invention, none of this liquid methanol is returned to the vapor stream.

Figure 3:
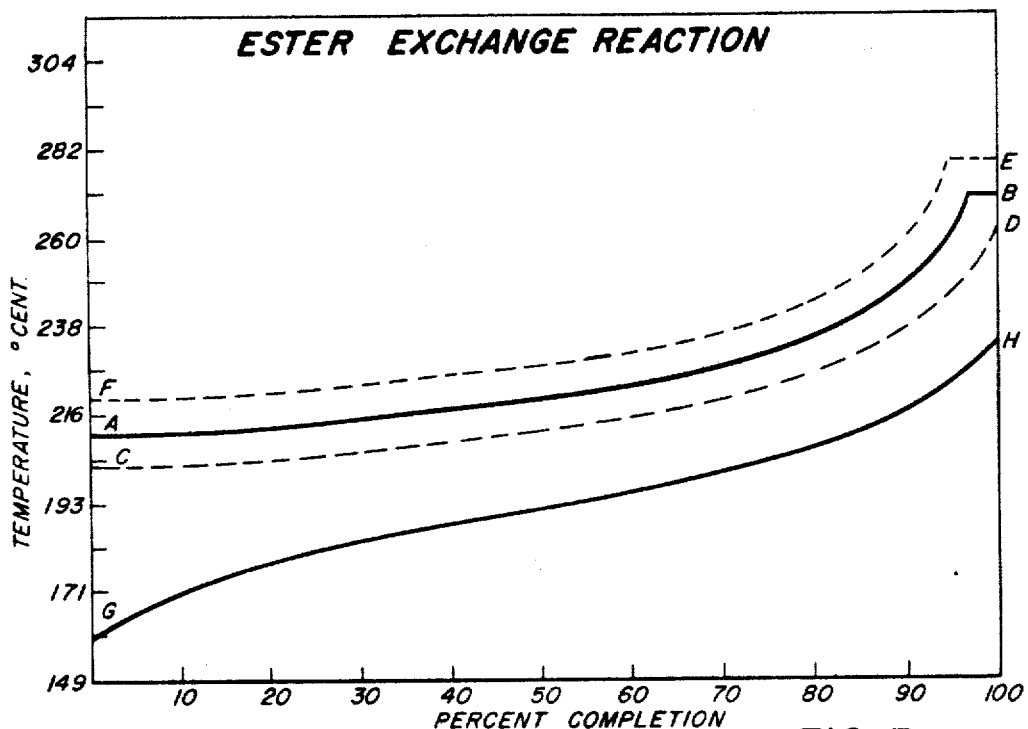

One of the key factors, insofar as the successful practice of the present invention is concerned, is illustrated by FIGURE 3. FIGURE 3 shows the relationship between reactor heater means temperature, reaction mixture temperature, and the extent of completion of the reaction (in terms of the percent methanol evolved and collected, as compared with the theoretical amount that should be evolved if the reaction went to completion). Curve GH in FIGURE 3 illustrates a typical history of the temperature of the reaction mixture (ethylene glycol+DMT→evolved methanol+"monomer") in a process such as that described above, while AB is the curve representing the temperature history of the reactor wall (in contact with the reaction mixture) during the same process. The area between the lines CD and EF in FIGURE 3 represents a range for the control of the reactor's heated surfaces in the preferred practice of the present invention. While minor deviations from the temperature control pattern outlined by the area CDEF in FIGURE 3 can be made; generally, for optimum benefits in accordance with the present processes, the temperature of the heated surfaces in contact with the reaction mixture described heretofore must be within the limits defined by CDEF during at least about 95% of the reaction period. The relatively sharp increase in the temperature of the product near the end of the reaction period is to aid in the initiation of the polymerization reaction, to which products from the "ester exchange" step are ultimately subjected. It is not essential for the successful practice of the present invention.

Figure 4:
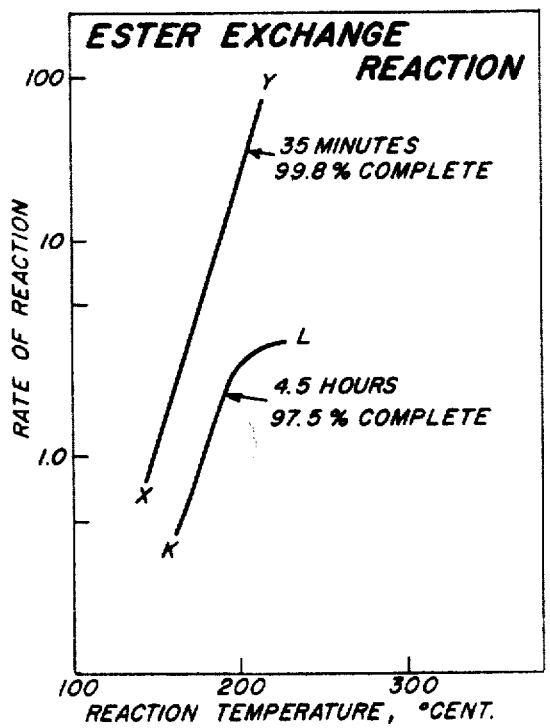

FIGURE 4 illustrates the type of rates of the desired reaction that can be obtained in the preferred practice of this invention (i.e. when all of the above-detailed critical processing elements are followed), as compared with rates presently obtained in conventional commercial practice. Curve KL illustrates conventional practice, using equipment like that shown in FIGURE 1. Curve XY represents rates obtainable by the present process.

The particular catalysts chosen, concentration of catalysts, quantities of ethylene glycol and dimethyl terephthalate, and reactor heat transfer, affect the particular position of the reaction mixture temperature history (such as curve GH in FIGURE 3). However, in practice, variations from temperatures along curve GH are generally not more than a few degrees. A curve such as GH, for example, can be obtained by utilizing a catalyst mixture of from about 60 to about 150 p.p.m. of Zn (as zinc acetate dihydrate initially), from about 5 to about 30 p.p.m. of Ti (as tetraisopropyl titanate initially), or from about 100 to about 500 p.p.m. of Sb (as antimony trioxide or triacetate initially) in a reaction mixture of from about 1.6 to about 2 moles of ethylene glycol per mole of DMT. Such a preferred initial reaction mixture begins to react at a temperature of about 150° C.

The major purpose of the equipment above the reaction mixture is to remove superheat from the gaseous mixture with a minimum of interference with the forward flow of the gas stream from the reactor to the methanol condenser. This results in a minimum pressure drop across the heat exchanger. This, in turn, causes the relative vapor pressure of sublimed DMT to be reduced to such an extent that it is no longer a practical problem. Thus, it has been found that, in order to obtain the substantial benefits described above in accordance with this invention, the pressure drop in the vapor stream across the heat exchanger(s), from the reactor to the methanol condenser must be less than ten inches of water pressure, and for optimum results, should be at most about 5 inches of water.

Cooling of the superheated methanol vapor containing objectionable sublimate and traces of ethylene glycol can also be accomplished in a controlled hot temperature condenser, sometimes called a thermal syphon. For example, the vapor temperature may be controlled by using a boiling water condenser to remove much of the superheat and a second hot temperature condenser, using a liquid hydrocarbon such as hexane (B.P. 69° C.), or water boiling at reduced pressure, to remove all or nearly all of the superheat from the gas stream via the necessary "external" heat exchange. The actual form of the heat exchange means along the hot vapor stream is not a limiting factor insofar as the successful practice of this invention is concerned, so long as the aforesaid "minimum pressure drop" criteria are abided by. Thus, the coolants that are contacted with the hot stream of vapors can be simply conducted within the walls of a jacketed shell and tube type condenser in one of the preferred aspects of the present processes. Or the coolants can be conducted, for example, through coils that are positioned in the vapor stream inside insulated walls of the heat exchanger units. A very large amount of surface area (for heat exchange) is not essential for the practice of the present processes because only the superheat from the methanol in the vapor stream need be removed therefrom in the present processes. Glycol and DMT are condensed at the same time. This is in direct contrast to the conventional practices described hereinbefore, where a very large amount of heat exchanger surface area must be provided in the fractionating columns over the reactor in order to provide an adequate amount of surface area exposed to the vapor stream to evaporate the liquid methanol that is recycled in such processes.

Accordingly, as set forth above and illustrated in the following examples, the ester exchange reaction is enabled to proceed at maximum velocity by the process of this invention which provides in combination the provision of a high concentration of ethylene glycol in the refluxing condensate and an "external" vapor cooler (or heat exchanger) that provides with its wetted walls between about 1 theoretical plate and about 4 theoretical plates for fractionating the ethylene glycol and methanol; said heat exchanger-cooler having controlled capacity for removing only the superheat from the evolved methanol, all with minimum pressure drop and essentially no recycle of liquid methanol.

Refluxing ethylene glycol from the reaction provides a return carrier for the dimethyl terephthalate subliming from the reaction. Substitute carriers may be used, however, in addition to ethylene glycol. For example, inert liquids of intermediate boiling points, such as xylene or trichloropropane, may be used. It is obvious however that the use of ethylene glycol or propylene glycol is more advantageous.

The following examples further illustrate preferred embodiments of the apparatus and procedure of the invention.

EXAMPLE 1

A fifty-gallon reactor equipped with an agitator, blanketed with inert gas at atmospheric pressure, and completely jacketed is used for the ester exchange reaction. Two 4-inch diameter stainless steel coolers in series are used to cool the evolved vapors. Each cooler is a controlled temperature heat exchanger. Boiling water is used in the jacket of the first cooler to reduce the temperature of the reaction vapors to near that of boiling water and thereby condense practically all of the DMT and glycol in the gas stream. The second controlled temperature heat exchanger contains hexane in its jacket, which is chosen because it boils a few degrees above that of methanol, thus insuring that practically all of the superheat is removed from the methanol vapor without methanol being condensed in the heat exchanger. Both heat exchangers are of the shell-in tube type "bundle" heat exchangers with a few internal baffles to provide the desired area for heat transfer and vapor cooling with practically no channeling, with very low pressure drop (about 4 inches of water), and an exchange capacity of about three theoretical plates.

To the reactor are added 100 lbs. of dimethyl terephthalate, 55 lbs. of ethylene glycol (EG/DMT of 1.72), 10 g. zinc acetate dihydrate (65 p.p.m. Zn), and 12.5 g. (230 p.p.m. Sb) of antimony trioxide.

| Reaction time, min. | Reactor jacket temp.,° C. | Reaction mixture temp.,° C. | Pounds methanol evolved | Percent reacted | Reaction rate, $kM \times 10^4$ |
|---|---|---|---|---|---|
| 0 | 210 | 177 | 0 | 0 | |
| 15 | 215 | 180 | 8.50 | 25.8 | 2.1 |
| 30 | 220 | 185 | 15.25 | 46.2 | 2.6 |
| 45 | 223 | 190 | 21.00 | 63.6 | 3.8 |
| 60 | 228 | 195 | 25.75 | 78.0 | 5.4 |
| 75 | 240 | 210 | 29.25 | 88.6 | 8.0 |
| 90 | 250 | 212 | 31.00 | 93.9 | 8.4 |
| 105 | 270 | 221 | 32.75 | 99.2 | 22.6 |
| | | | 33.00 | 100.0 | |

$k$ is the second order reaction specific rate constant;
M is the equivalent of catalyst per one mole of COOR or terephthalyl group.

At 374° F. (190° C.) the rate of the reaction $kM$ is $4.3 \times 10^{-4}$ and $k=2.2$ for one equivalent of zinc catalyst per mole of terephthalyl group. Total reaction time is only one hour and five minutes.

In Example 2, below, a conventional ester exchange process is illustrated for comparative purposes.

EXAMPLE 2

Utilizing the same reaction mixture charge as that shown in Example 1, but in a conventional ester exchange reactor such as that shown in FIGURE 2, the process is only 97.5% completed in 4½ hours. In this instance, a "bubble cap" type column having a capacity of about 12 theoretical plates (pressure drop about 22 inches of water) is utilized, with the amount of recycle liquid methanol being determined by the amount of superheat in the vapor stream. The reaction is driven (by heating the reactor) as fast as practicable without actually "flooding" the column or causing plugging of the column with sublimed DMT. Thus, the process is accomplished at about as fast an overall rate as possible.

The curve KL in FIGURE 4 illustrates the conventional reaction of Example 2, above. By comparison, the curve for the reaction of Example 1 lies very close to XY and has a similar, practically straight line designation. In FIGURE 4, the forward rate of reaction is found to be $kM=0.8 \times 10^{-4}$ or $10^{-4}$ per equivalent of zinc catalyst used, which is much lower than rates shown in Example 1.

EXAMPLE 3

Reactants just like those illustrated in Example 1 are placed in a stainless steel reactor. The reactor is heated with electrical heaters so that the amount of heat transferred to the flask can be rapidly controlled. Above the reactor is a one inch diameter column filled with protruded stainless steel packing. This column cooled with moving air provides the heat transfer medium for removing the superheat from the ethylene glycol-methanol (plus sublimate) vapors and has a capacity of about two theoretical plates. Beyond this heat exchanger is placed a cold water condenser to condense the methanol vapors. The condensed vapors are thus removed almost as rapidly as they are formed. Under optimal conditions in which the heat input is maximized while the column is operated to give practically pure methanol distillate a high rate of methanol is evolved, utilizing reaction temperatures such as those illustrated by curve GH in FIGURE 3, minimum pressure drop and minimum heat losses for each reaction. (The pressure drop across the vapor heat exchanger is at most only 5 inches of water during the process.) With the zinc catalyst concentration varying between 32 p.p.m. and 320 p.p.m., specific rate constants of zinc can vary between 4.0 and 5.0 with an average of about 4.5. Reaction times can be as low as 17 minutes for the experiment using the 320 p.p.m. of zinc. This is a result of the actual rate of reaction of 190° C. being ten times that obtained with 32 p.p.m. of zinc catalyst. The latter requires about 48 minutes.

I claim:
1. In a process for manufacturing a polyester of dimethyl terephthalate and ethylene glycol which process comprises heating a liquid mixture of said ethylene glycol and said dimethyl terephthalate in the presence of an ester exchange catalyst at a temperature of at least 150° C. to thereby form a monomer and a gaseous mixture of said ethylene glycol and methanol; the improvement which comprises:
   (a) maintaining the surfaces of the reactor that are in contact with said liquid mixture at a temperature which is within the range designated CDEF in FIGURE 3 during at least about 90% of the period of time said gaseous mixture is being formed in said reactor;
   (b) removing superheat from said gaseous mixture by contacting said gaseous mixture with a cooled first heat exchange surface in a first condenser; the temperature of said first heat exchange surface being sufficiently low to cause at least about 90 percent of the ethylene glycol in said gaseous mixture to condense during said contacting to thereby form condensed ethylene glycol and a partially purified gas stream;
   (c) returning at least about half of said condensed ethylene glycol to said reactor; the temperature of said condensed ethylene glycol being within about 10° C. of its boiling point when it is returned to said reactor;
   (d) conducting said partially purified gas stream, at a temperature of from about 90° C. to about 160° C., away from said cooled first heat exchange surface to a cold second condenser;
   (e) thereafter, in said cold second condenser, reducing the temperature of said gas stream to within the range of from about 65° C. to about 85° C.; and
   (f) subsequently condensing said methanol and withdrawing it from said process; said gaseous mixture in said partially purified gas stream being uninterrupted during steps (b), (c) and (d) to thereby maintain a pressure drop between said reactor and said cold second condenser of at most about 10 inches of water.

2. An improved process as in claim 1, wherein said first heat exchanger is comprised of a first shell and tube condenser and a second shell and tube condenser in series, the temperature of the gas stream between said first shell and tube condenser and said second shell and tube condenser being between about 90° C. and about 160° C., and the temperature of the exit gas stream from said second shell and tube condenser being about 70° C.

3. In a process for manufacturing a polyester of ethylene glycol and terephthalic acid, which process comprises the steps of:
   (a) initially forming a fluid mixture of ethylene glycol and dimethyl terephthalate, and
   (b) reacting together said dimethyl terephthalate and said ethylene glycol by heating in a reactor said fluid mixture in the presence of an ester exchange catalyst at a temperature of at least 150° C. to thereby simultaneously reflux said ethylene glycol and remove from the reaction mixture gaseous methyl alcohol formed during said heating; the improvement which comprises
   (1) maintaining the surfaces of the heat transfer means in said reactor that are in contact with said fluid mixture at a temperature which is within the range designated CDEF in FIGURE 3 during at least about 90 percent of the period of time said gaseous methyl alcohol is being formed, to thereby form a superheated gaseous mixture of ethylene glycol and methyl alcohol;
   (2) conducting said gaseous mixture through a first heat exchanger; said first heat exchanger being in refluxing relationship with said reactor, having a pressure drop across its length of at most about 5 inches of water, and being maintained at a temperature which is sufficiently low to condense at least about 95 percent of the ethylene glycol in said gaseous mixture, but which temperature is also at least about 10° C. higher than the boiling point of methyl alcohol at the pressure in said reactor; the temperature of the condensed glycol when it is returned to said reactor being within about 10° C. of its boiling point at said pressure and the temperature of the gas stream exiting from said first heat exchanger being within the range of from about 90° C. to about 160° C.;
   (3) thereafter conducting the resulting partially purified gaseous mixture through a second heat exchanger in refluxing relationship with said first heat exchanger; said second heat exchanger having a pressure drop across its length of at most about 5 inches of water and being maintained at a temperature which is sufficiently high to prevent said methyl alcohol from condensing, but which is sufficiently low to thereby condense at least about 99 percent of the glycol from said partially purified gaseous mixture, the temperature of the resulting gaseous methyl alcohol stream exiting from said second heat exchanger being from about 65° C. to about 85° C.; and
   (4) subsequently condensing said methyl alcohol to thereby form liquid methyl alcohol.

4. An improved process as in claim 3 wherein said first heat exchanger and said second heat exchanger are shell and tube type heat exchangers, the temperature of said partially purified gaseous mixture is about 140° C. when it is conducted from said first heat exchanger and the gas stream flowing uninterruptedly from said reactor through said first heat exchanger and said second heat exchanger exhibiting a pressure drop of at most about 5 inches of water; substantially none of said liquid methyl alcohol being recycled into said gas stream.

References Cited

UNITED STATES PATENTS

| 2,739,957 | 3/1956 | Billica et al. | 260—75 |
| 2,820,023 | 1/1958 | Cavanaugh et al. | 260—75 |
| 2,829,153 | 4/1958 | Vodonik | 260—470 |
| 2,952,664 | 9/1960 | Ballentine | 260—75 |
| 3,268,482 | 8/1966 | Piirma et al. | 206—75 |
| 3,321,444 | 5/1967 | Hoyer et al. | 260—75 |

WILLIAM H. SHORT, Primary Examiner

M. GOLDSTEIN, Assistant Examiner

U.S. Cl. X.R.

260—75

PO-1050
(5/69)

UNITED STATES PATENT OFFICE
CERTIFICATE OF CORRECTION

Patent No. 3,488,382          Dated January 6, 1970

Inventor(s) Kenneth T. Barkey

It is certified that error appears in the above-identified patent and that said Letters Patent are hereby corrected as shown below:

In the Specification

In column 2, line 32 delete "Polyesterification" ans substitute therefor ---Polyesterifications---.

In column 5, line 25 delete "FIGURES" and substitute therefor ---FIGURE---.

In column 5, line 47 delete "90 C.," and substitute therefor ---90°C.,---.

In column 8, line 46 delete "or $10^{-4}$" and substitute therefor ---or $0.4 \times 10^{-4}$---.

SIGNED AND SEALED
SEP 15 1970

(SEAL)
Attest:

Edward M. Fletcher, Jr.
Attesting Officer

WILLIAM E. SCHUYLER, JR.
Commissioner of Patents